United States Patent
Gafni et al.

(10) Patent No.: US 12,126,541 B2
(45) Date of Patent: Oct. 22, 2024

(54) EARLY AND EFFICIENT PACKET TRUNCATION

(71) Applicant: MELLANOX TECHNOLOGIES, LTD., Yokneam (IL)

(72) Inventors: Barak Gafni, Sunnyvale, CA (US); Aviv Kfir, Nili (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 149 days.

(21) Appl. No.: 17/850,537

(22) Filed: Jun. 27, 2022

(65) Prior Publication Data

US 2023/0421508 A1    Dec. 28, 2023

(51) Int. Cl.
*H04L 47/00* (2022.01)
*H04L 47/36* (2022.01)

(52) U.S. Cl.
CPC .................................. *H04L 47/365* (2013.01)

(58) Field of Classification Search
CPC ... H04L 49/901; H04L 49/90; H04L 49/9021; H04L 49/103; H04L 49/108; H04L 49/9047; H04L 49/9026; H04L 47/50; H04L 47/32; H04L 47/10; H04L 49/9015; H04L 49/3027; G06F 16/24552; G06F 3/0631; G06F 3/0656
See application file for complete search history.

(56) References Cited

U.S. PATENT DOCUMENTS

| | | | |
|---|---|---|---|
| 10,313,255 B1 * | 6/2019 | Matthews | H04L 47/32 |
| 2008/0240111 A1 * | 10/2008 | Gadelrab | H04L 49/90 |
| | | | 370/395.7 |
| 2014/0133314 A1 * | 5/2014 | Matthews | H04L 41/0661 |
| | | | 370/244 |
| 2017/0237661 A1 * | 8/2017 | Ferguson | H04L 47/10 |
| | | | 370/392 |

FOREIGN PATENT DOCUMENTS

WO    WO-02069668 A1 *   9/2002    ........... H04L 49/203

\* cited by examiner

*Primary Examiner* — Gerald A Smarth
(74) *Attorney, Agent, or Firm* — Sheridan Ross P.C.

(57) ABSTRACT

Networking devices, systems, and methods are provided. In one example, a method includes receiving a packet at a networking device; evaluating the packet; based on the evaluation of the packet, truncating the packet from a first size to a second size that is smaller than the first size; and storing the truncated packet in a buffer prior to transmitting the truncated packet with the networking device.

21 Claims, 7 Drawing Sheets

EARLY AND EFFICIENT PACKET TRUNCATION

FIELD OF THE DISCLOSURE

The present disclosure is generally directed toward networking devices and, in particular, toward efficient packet processing within a networking device.

BACKGROUND

Networking devices such as routers, switches, Network Interface Controllers (NICs), etc. normally include a packet processing subsystem that manages the traversal of packets across a multi-layered network or protocol stack. In some networks, packet processing functions are injected into the network. One way to inject the packet processing function is to configure packets to carry the processing code that networking devices apply when performing forwarding or routing functions. Network behavior and quality can be vastly improved if each packet is processed as efficiently as possible.

BRIEF SUMMARY

Embodiments of the present disclosure aim to improve network performance by enhancing packet routing processes. In some embodiments, the improved packet routing processes may be performed by or within a networking device. Examples of networking devices that may be configured perform the operations depicted and described herein may include, without limitation, a switch, a NIC, a network adapter, an Ethernet card, an expansion card, a Local Area Network (LAN) adapter, a wireless router, a physical network interface, a network border device (e.g., Session Border Controller (SBC), firewall, etc.) or similar type of device configured to perform network or data transfer processes.

Illustratively, and without limitation, a networking device is disclosed herein to include: an interface that receives one or more packets; a buffer that temporarily stores the one or more packets prior to being transmitted by the networking device; and circuitry that evaluates a packet received at the interface and, based on the evaluation of the packet, truncates the packet thereby reducing a size of the packet prior to storing the packet in the buffer.

In some embodiments, the circuitry further divides the packet into two or more packet portions that are stored in a corresponding two or more cells in the buffer.

In some embodiments, the packet is divided prior to truncation.

In some embodiments, the packet is divided after truncation.

In some embodiments, the truncated packet occupies a number of cells in the buffer that is smaller than a number of cells that the packet would occupy prior to truncation.

In some embodiments, the packet is initially stored in the buffer prior to truncation and at least one pointer is adjusted as part of truncating the packet to release at least one cell in the buffer thereby allocating more buffer space to storage of other packets.

In some embodiments, the networking device may further include an output port, where the circuitry reads the truncated packet from the buffer and causes the truncated packet to be transmitted via the output port.

In some embodiments, the networking device may further include a multiplexer, where the circuitry reads the truncated packet from the buffer and causes the truncated packet to be provided to the multiplexer.

In some embodiments, the circuitry determines an amount of buffer space saved by truncating the packet and frees up the amount of buffer space for storage of an additional packet prior to reading the truncated packet from the buffer.

In some embodiments, the circuitry reads the truncated packet from the buffer using at least one of a linked list and a database lookup.

In some embodiments, the circuitry updates a descriptor of the packet to describe a length of the truncated packet as stored in the buffer.

In another example, a system is described that includes: a networking device that receives one or more packets, where the networking device includes a buffer that temporarily stores the one or more packets prior to being transmitted by the networking device; and a controller that evaluates a packet received at the networking device and, based on the evaluation of the packet, truncates the packet thereby reducing a size of the packet for storage in the buffer.

In some embodiments, the controller is provided as part of the networking device.

In some embodiments, the controller divides the packet into two or more packet portions that are stored in a corresponding two or more cells in the buffer.

In some embodiments, the truncated packet occupies a number of cells in the buffer that is smaller than a number of cells that the packet would occupy prior to truncation.

In some embodiments, the packet is initially stored in the buffer prior to truncation and at least one pointer is adjusted as part of truncating the packet to release at least one cell in the buffer thereby allocating more buffer space to storage of other packets.

In some embodiments, the controller determines an amount of buffer space saved by truncating the packet and frees up the amount of buffer space for storage of an additional packet prior to reading the truncated packet from the buffer.

In another example, a method is disclosed that includes: receiving a packet at a networking device; evaluating the packet; based on the evaluation of the packet, truncating the packet from a first size to a second size that is smaller than the first size; and storing the truncated packet in a buffer prior to transmitting the truncated packet with the networking device.

In some embodiments, the method further includes dividing the packet into two or more packet portions that are stored in a corresponding two or more cells of the buffer, where the truncated packet occupies a number of cells in the buffer that is smaller than a number of cells that the packet would occupy in the buffer prior to truncation.

In some embodiments, the method further includes multiplexing the truncated packet; and transmitting the multiplexed truncated packet via a port of the networking device.

Additional features and advantages are described herein and will be apparent from the following Description and the figures.

BRIEF DESCRIPTION OF THE SEVERAL VIEWS OF THE DRAWINGS

The present disclosure is described in conjunction with the appended figures, which are not necessarily drawn to scale.

DETAILED DESCRIPTION

Figure 1A:
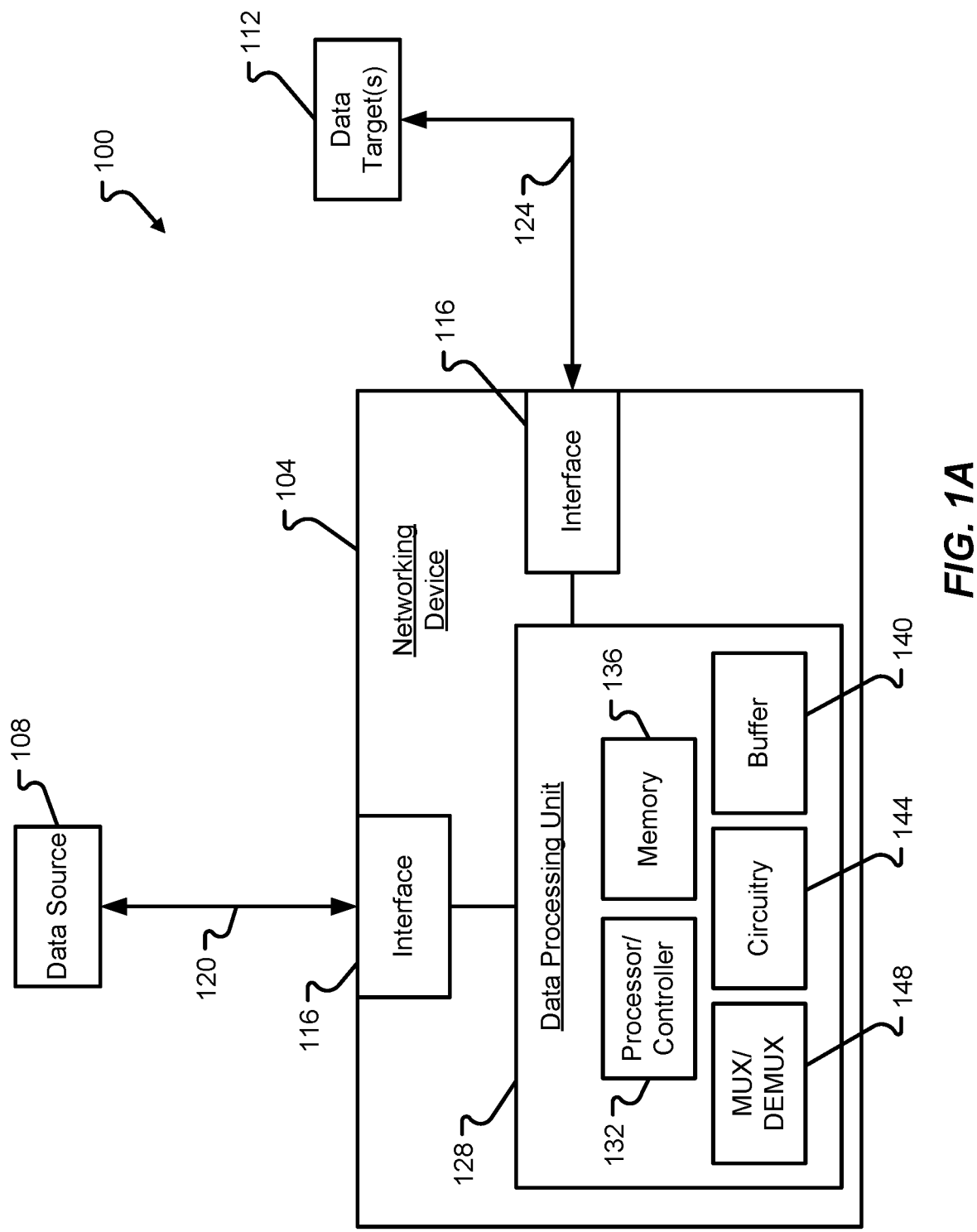
FIG. 1A is a block diagram illustrating a computing system in accordance with at least some embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a Printed Circuit Board (PCB), or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means: A alone, B alone, C alone, A and B together, A and C together, B and C together, or A, B and C together.

The term "automatic" and variations thereof, as used herein, refers to any appropriate process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine," "calculate," and "compute," and variations thereof, as used herein, are used interchangeably and include any appropriate type of methodology, process, operation, or technique.

Various aspects of the present disclosure will be described herein with reference to drawings that are schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Referring now to FIGS. 1-6, various systems and methods for packet processing will be described in accordance with at least some embodiments of the present disclosure. As will be described in more detail herein, packet processing may include evaluating and truncating a packet. It may be possible to truncate a packet in such a way that buffer allocation to the packet is minimized. It may also be possible to truncate the packet in such a way that no necessary data is lost, but overall network performance is increased.

Figure 1B:
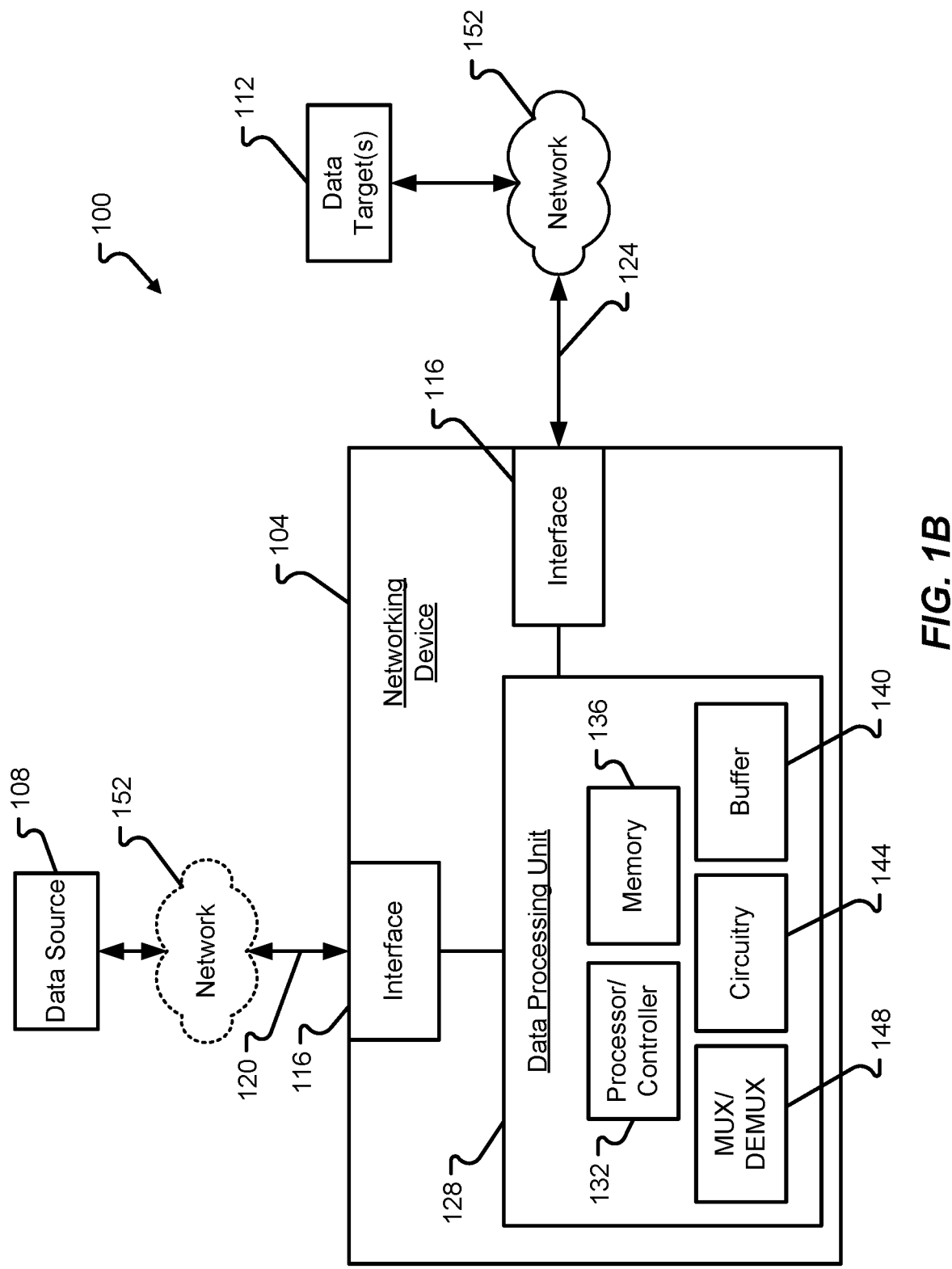
FIG. 1B is a block diagram illustrating an alternative arrangement of a computing system in accordance with at least some embodiments of the present disclosure.

Referring initially to FIGS. 1A and 1B, an illustrative computing system 100 is shown in which a networking device 104 is configured to communicate with a data source 108 and a data target 112. While only a single data target 112 is depicted, it should be appreciated that the networking device 104 may route information received from a data source 108 to multiple data targets 112.

The networking device 104 may include any type of device used to facilitate machine-to-machine communications. As mentioned above, the networking device 104 may include one or more of a switch, a NIC, a network adapter, Host Channel Adapter (HCA), an Ethernet card, an expansion card, LAN adapter, physical network interface, a wireless router, a network border device, or the like. Alternatively or additionally, the networking device 104 may be referred to as a data transfer device and, in some embodiments, may correspond to a format-aware data transfer device. In some embodiments, the networking device 104 is provided with a data processing unit 128 that is configured to perform data processing functions within the networking device 104. Specifically, the networking device 104 may be configured to perform data transfer functions as well as packet truncation operations.

The networking device 104 may be connected with the data source 108 via a first device interface 116. The first device interface 116 may enable communications between the networking device 104 and the data source 108 via a first communication link 120. The first communication link 120 may include a wired connection, a wireless connection, an electrical connection, etc. In some embodiments, the first communication link 120 may facilitate the transmission of data packets between the networking device 104 and the data source 108 via one or more of electrical signals, optical signals, combinations thereof, and the like. The data packets may carry data from the data source 108 to the networking device 104, which is intended for transmission to the data target(s) 112. In other words, the networking device 104 may enable communications between the data source 108 and the data target(s) 112 and may further utilize the data processing unit 128 to transfer data from the data source 108 to the data target(s) 112. It should be appreciated that the system bus (e.g., the pathway carrying data between the data source 108 and data target(s) 112) may include, without limitation, a PCIe link, a Compute Express Link (CXL) link, a high-speed direct GPU-to-GPU link (e.g., an NVlink), etc.

The networking device 104 may be connected with one or more data targets 112 via a second device interface 116. The second device interface 116 may be similar or identical to the first device interface 116. In some embodiments, a single device interface 116 may be configured to operate as the first device interface 116 and the second device interface 116. In other words, a single device interface 116 may connect the networking device 104 to the data source 108 and the data target(s) 112. In some embodiments, however, different physical devices may be used for the different interfaces, meaning that the first device interface 116 may correspond to a first physical device that is different from a second physical device operating as the second device interface 116. The second device interface 116 may enable communications between the networking device 104 and data target(s) 112 via a second communication link 124. As can be appreciated, the second communication link 124 may include one or multiple different communication links depending upon the number of data targets in the data target(s) 112. Much like the first communication link 120, the second communication link 124 may include a wired connection, a wireless connection, an electrical connection, etc. In some embodiments, the second communication link 124 may facilitate the transmission of data packets between the networking device 104 and the data target(s) 112 via one or more of electrical signals, optical signals, combinations thereof, and the like.

In some embodiments, the first device interface 116 and/or second device interface 116 may include a single communication port, multiple communication ports, a serial data interface, a PCIe, an Ethernet port, an InfiniBand (TB) port, etc. The first communication link 120 and/or second communication link 124 may be established using a networking cable, an optical fiber, an electrical wire, a trace, a serial data cable, an Ethernet cable, or the like. The first communication link 120 and/or second communication link 124 may utilize any type of known or yet-to-be-developed communication protocol (e.g., packet-based communication protocol, serial communication protocol, parallel communication protocol, etc.).

Source data access and/or target data access may be achieved over a system bus (e.g., locally), over a network port (e.g., remotely), or neither (e.g., for an on-device memory). While various embodiments will be depicted or described in connection with a particular type of data access, it should be appreciated that the claims are not limited to any particular type of data access.

The data source 108 and/or data target(s) 112 may correspond to or include any type of known computational device or collection of computational devices. A data source 108, for example, may include a host device, an on-network device memory, a peer device memory, etc. A data target 112, for example, may include a host memory device, an on-network device memory, a peer device memory, etc. In some embodiments, that data target(s) 112 may be located in proximity with the networking device 104 (e.g., a physical cable may be used to directly connect a data target 112 with the networking device 104). In some embodiments, as shown in FIG. 1B, one or more data targets 112 may be located remotely from the networking device 104 and the data processing unit 128 of the networking device 104. Specifically, the data target(s) 112 may be connected to the networking device 104 via a communication network 152 without departing from the scope of the present disclosure. FIG. 1B also illustrates an optional communication network 152 positioned between the data source 108 and the networking device 104. It should be appreciated that the data source 108 may be remotely located from the networking device 104, in which case a communication network 152 may be provided between the data source 108 and networking device 104. In any configuration, the networking device 104 may be configured to utilize the data processing unit 128 as part of transferring data between a data source 108 and data target 112.

Examples of a data source 108 and/or data target 112 include, without limitation, a host device, a server, a network appliance, a data storage device, a camera, a neural network, a Deep Neural Network (DNN), or combinations thereof. A data source 108 and/or data target 112, in some embodiments, may correspond to one or more of a Personal Computer (PC), a laptop, a tablet, a smartphone, a cluster, a container, or the like. It should be appreciated that a data source 108 and/or data target 112 may be referred to as a host, which may include a network host, an Ethernet host, an IB host, etc. As another specific but non-limiting example, one or more of the data source 108 and/or data target(s) 112 may correspond to a server offering information resources, services and/or applications to user devices, client devices, or other hosts in the computational system 100. It should be appreciated that the data source 108 and/or data target(s) 112 may be assigned at least one network address (e.g., an Internet Protocol (IP) address) and the format of the network address assigned thereto may depend upon the nature of the network to which the device is connected.

The networking device 104 may correspond to an optical device and/or electrical device. The data processing unit 128 of the networking device 104 may be configured to receive data from the data source 108, collect the data received from the data source 108 until a predetermined amount of data has been collected, truncate one or more packets used to carry the data, and then transmit the data to one or more data targets 112 using truncated packets. In some embodiments, the data processing unit 128 may include components that sit between different device interfaces 116. In some embodiments, the data processing unit 128 may include components that process data received at a device interface 116 from the data source 108 and then transmit data to a data target 112 via the same device interface 116.

Components that may optionally be included as part of the data processing unit 128 include, without limitation, a processor 132, memory 136, a buffer 140, circuitry 144, and/or a Multiplexer/Demultiplexer (MUX/DEMUX) 148. The buffer 140 may include one or multiple buffer memory devices and may correspond to an area or type of memory device that is used to collect data received from the data source 108. The buffer 140 may alternatively or additionally store truncated versions of the data received from the data source 108 prior to the networking device 104 transmitting the data to the data target(s) 112 (e.g., as truncated data).

The memory 136 may include instructions for execution by the processor 132 that, when executed by the processor 132, enable the data processing unit 128 to analyze data received from the data source 108 and truncate the data (e.g., truncate packets) in an efficient manner. The instructions stored in memory 136 may also enable the processor 132 to transmit the truncated data to the data target(s) 112.

The circuitry 144 may be provided as part of the processor 132 or may be specifically configured to perform a function of the processor 132 without necessarily referencing instructions in memory 136. For instance, the circuitry 144 may include digital circuit components, analog circuit components, active circuit components, passive circuit components, or the like that are specifically configured to perform a particular data truncation operation and/or transmission process. The circuitry 144 may alternatively or additionally include switching hardware that is configurable to selectively interconnect one device interface 116 with another device interface 116 (e.g., where the networking device 104 includes a switch or a component of a switch). Accordingly, the circuitry 144 may include electrical and/or optical components without departing from the scope of the present disclosure.

The processor 132 and/or circuitry 144 may include one or more Integrated Circuit (IC) chips, microprocessors, circuit boards, CPUs, Graphics Processing Units (GPUs), Data Processing Units (DPUs), simple analog circuit components (e.g., resistors, capacitors, inductors, etc.), digital circuit components (e.g., transistors, logic gates, etc.), registers, Field Programmable Gate Arrays (FPGAs), Application Specific Integrated Circuits (ASICs), combinations thereof, and the like. It should be appreciated that the processor 132 may correspond to an optional component of the data processing unit 128, especially in instances where the circuitry 144 provides sufficient functionality to support operations of the data processing unit 128 described herein.

The memory 136 may include any number of types of memory devices. As an example, the memory 136 may include Random Access Memory (RAM), Read Only Memory (ROM), flash memory, Electronically-Erasable Programmable ROM (EEPROM), Dynamic RAM (DRAM), buffer 140 memory, combinations thereof, and the like. In other words, the buffer 140 may be provided as part of memory 136 without departing from the scope of the present disclosure.

The MUX/DEMUX 148 may include one or more circuits that are capable of multiplexing and/or de-multiplexing data flows, data packets, etc. In some embodiments, the MUX/DEMUX 148 may be configured to process data flowing into and/or out of the buffer 140. For instance, the MUX/DEMUX 148 may multiplex data from two or more channels onto a single channel for transmission by the interface 116 to a data target 112. As another example, the MUX/DEMUX 148 may de-multiplex data received from a data source 108 at an interface 116 before storing separate data flows in the memory 136 or buffer 140.

Although FIGS. 1A and 1B illustrate a single data source 108 and a single box representing data target(s) 112, it should be appreciated that the networking device 104 may be configured to receive data from one, two, three, . . . , or many more data sources 108. The networking device 104 may also be configured to provide truncated data to one, two, three, . . . , or many more data targets 112. The illustration of a single data source 108 and single box representing data target(s) 112 is for illustration purposes only and should not be construed as limiting the scope of the claims. Indeed, aspects of the present disclosure contemplate the ability of the networking device 104 to receive data from a single data source 108 and provide truncated data to one or many data targets 112.

Figure 2:
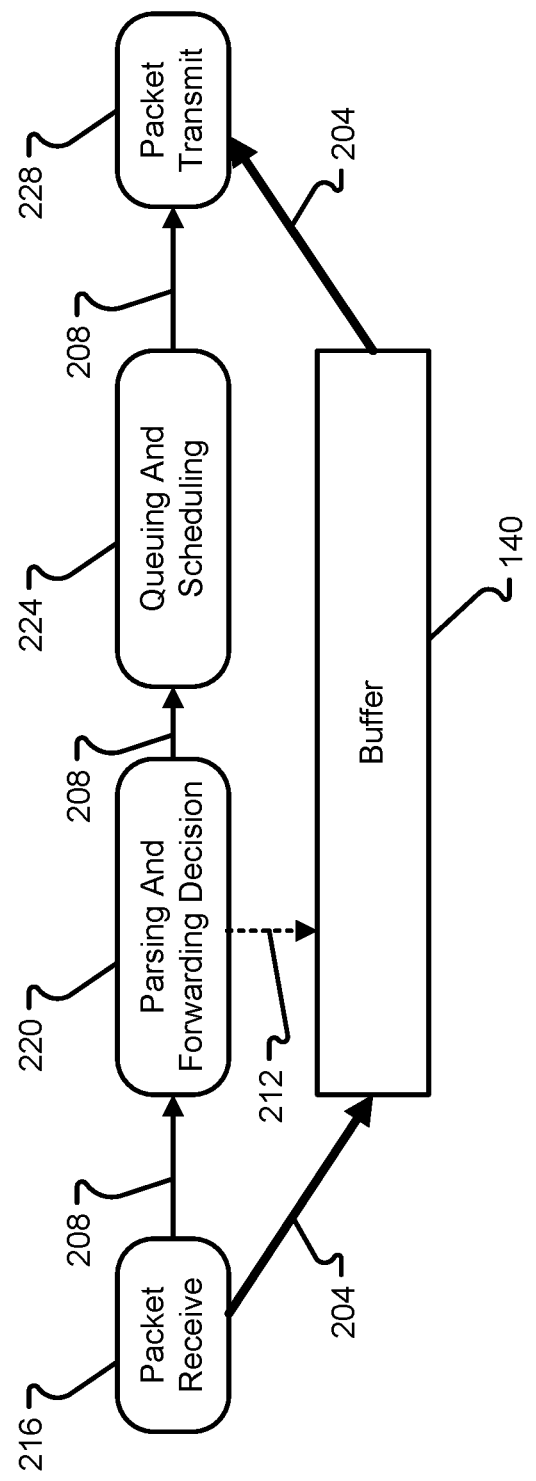
FIG. 2 is a block diagram illustrating details of a packet processing operation in accordance with at least some embodiments of the present disclosure.

With reference now to FIG. 2, additional details of data processing operations will be described in accordance with at least some embodiments of the present disclosure. FIG. 2 specifically illustrates a data processing pipeline in which a buffer 140 can be used to temporarily store a packet's data before and after the packets data has been truncated. In some embodiments, the packet's descriptor may follow a packet descriptor path 208 and the packet's data may follow a packet data path 204. The packet data path 204 may flow through the buffer 140 whereas the packet descriptor path 208 may bypass the buffer 140. Both the packet data path 204 and packet descriptor path 208 begin at a packet receive operation 216. When the packet is received in the packet receive operation 216 (e.g., at an interface 116 of a networking device 104 or within the DPU 128 itself), the packet's data may be written into the buffer 140. As will be described in further detail herein, the packet's data may initially be written to the buffer 140, then a truncation decision 212 may be made with respect to the packet's data based on an analysis of the packet data (e.g., data within the packet payload) and/or based on an analysis of metadata contained within the packet (e.g., data within the packet header). Alternatively, the truncation decision 212 may be made before the packet's data is written to the buffer 140 such that a smaller amount of space is required from the buffer 140 to store the packet's truncated data.

As noted above, the packet truncation decision 212 may be made during a packet parsing and forwarding decision 220. The packet parsing and forwarding decision 220 may occur before a packet's data is initially stored in the buffer 140 or after the packet's data is stored in a buffer, but prior to the packet's data being retrieved from the buffer 140 for packet transmission 228. Specifically, there are many ways to benefit from an early parsing and forwarding decision 220 that results in truncation decision 212. In one example, the packet's data may initially be stored in a first buffer 140, then a truncation decision 212 may be made. After the truncation decision 212, the packet's data may be truncated such that the truncated packet is stored in the first buffer 140 while packet queueing and scheduling 224 is occurring. Because the packet's data is truncated prior to packet transmission 228, less of the first buffer 140 is allocated to storing the packet's data.

In another example, the packet's data may initially be stored in a first buffer 140, then a truncation decision 212 may be made. After the truncation decision 212, the packet's data may be truncated and stored in a second buffer 140, which is different from the first buffer 140. Thus, while FIG. 2 illustrates a single buffer 140, it should be appreciated that the buffer 140 actually contains multiple different buffer memory devices. At this point, the first buffer 140 may be used to store the data from a next received packet and the amount of space required in the second buffer 140 is less than if the packet were not truncated. Again, this approach results in an efficient use of buffer 140 space.

In another example, the packet may be received 216 and a truncation decision 212 may be made before the packet's data is ever stored in a buffer 140. In this example, the truncated packet may initially be stored in the buffer 140 while additional forwarding decisions are made and while the packet is queued and scheduled 224 for transmission 228.

In another example, the packet may be received 216 and initially stored in the buffer 140, then a truncation decision 212 may be made. After making the truncation decision, the areas of buffer memory (e.g., registers) devoted to the now-removed (e.g., truncated) portions of the truncated packet may be released for storing data from other packet(s).

As can be appreciated, any combination of the above-mentioned approaches may be employed. In some embodiments, the processing of a packet may include the following stages, whose order may be adjusted as desired and appropriate:

(1) A packet is received in the networking device 104.
(2) A packet is being stored in the networking device 104 (e.g., in the buffer 140 and/or in memory 136). In some implementations this may happen only after stage (4).
  a. In some implementations a packet is cut into smaller "cells" to fit a fixed buffer 140 allocation.
  b. If cut into smaller cells, the cells could be linked to each other, potentially by a linked list where each cell has a pointer to the next one to form the whole packet.
(3) The packet is being parsed 220.
(4) The processor 132, by executing instructions in memory 136, determines what should be done with the packet (e.g., as part of the parsing and forwarding decision 220). In some examples, the processor 132 may identify that the packet should be sent to port(s) X (and Y), dropped, modified, assigned to a specific queue, etc.
  a. According to evaluation at (4), a truncation decision 212 is made, potentially based on the buffer 140 and/or queue status and/or any other policy. In this stage, the processor 132 decides to truncate the packet at the buffer 140 to a specific new size, which is smaller than the original/whole packet size.
  b. The packet is truncated, effectively reducing its occupancy and allowing additional data of different packets to get stored in it.
(5) The packet's "descriptor" is being sent towards a port(s)'s queue it should be transmitted from.
(6) Once the packet's descriptor(s) is being scheduled for transmission, the buffer 140 is being asked to read and send the packet's data to the relevant port(s).
(7) The data (now shorter) is read from the buffer 140. As part of this process, the data passes through channels and the MUX/DEMUX 148. Since the packet has already been truncated, fewer resources are required from the data channels and MUX/DEMUX 148 to facilitate packet transmission 228. In some implementations, the data may pass through the MUX/DEMUX 148 before being written to the buffer 140. This may result in a further reduction of resources required to carry the packet's data within the networking device 104.
(8) The packet is being sent out of the device from the respective port(s) during packet transmission 228.
  a. Before sending the packet, its Cyclic Redundancy Check (CRC) (and/or other similar protection fields for different protocols) can be recalculated to prevent the next-hop networking device 104 from dropping the packet.

With reference now to FIGS. 3-6, various possible methods of processing a packet will be described in accordance with at least some embodiments. It should be appreciated that any of the components depicted and/or described herein may be configured to perform some or all of the method steps. It should also be appreciated that any step from any of the methods may be included in any other method without departing from the scope of the present disclosure. Said another way, the order of steps depicted and described herein should not be construed as limiting the scope of the claims to that particular order.

Figure 3:
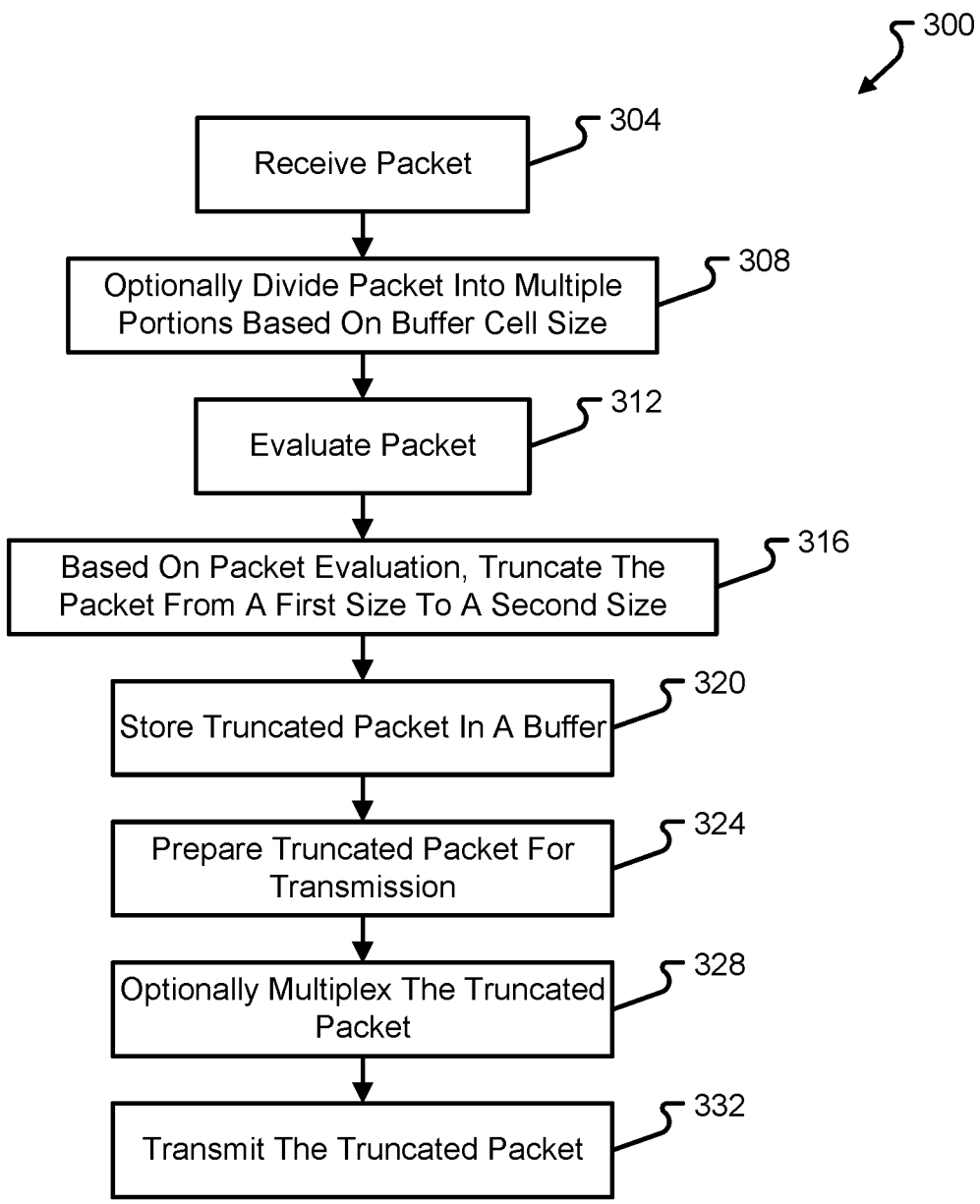
FIG. 3 is a flow diagram illustrating a first packet processing method in accordance with at least some embodiments of the present disclosure.

Referring initially to FIG. 3, a first packet processing method 300 will be described in accordance with at least some embodiments of the present disclosure. The method 300 begins when a packet is received at the networking device 104 (step 304). The packet may then, optionally, be divided into multiple portions based on the size of the packet and based on the cell size of the buffer 140. In particular, if the size of the packet data exceeds a single cell size of the buffer 140, then it may be desirable to divide the packet into multiple portions such that different portions can be stored in different cells of the buffer 140.

The method 300 then continues with the processor 132 evaluating the packet (step 312). The packet data and/or metadata may be analyzed to make a forwarding decision with respect to the packet and to make a truncation decision 212 with respect to the packet. Based on the evaluation of the packet, the processor 132 may make a truncation decision 212 (step 316). The truncation decision 212 may correspond to a decision that the packet has at least some unnecessary or unwanted data in its payload. In some embodiments, a truncation decision 212 may be made if some of the data being truncated was required for a previous hop on a network, but is no longer required. In some embodiments, the truncation decision 212 may be made if some of the data in the packet is used to support a protocol not used within the network. A truncation decision 212 can be made for any reason and does not necessarily have to be made with respect to data in the packet's payload. For instance, packet metadata may also be removed during packet truncation. In any event, the truncation decision 212 will result in the packet being truncated from a first size to a second size that is smaller than the first size (step 316). When considering the truncation of the packets, it should be noted that assuming an implementation where the packet's cells are being connected as a linked list, going through the linked list to "remove" the unneeded data may cost performance from the buffer 140 and take longer than desired. Thus, it may be possible to truncate a packet as efficiently as possible and in a way that does not necessarily "remove" the unneeded data from the buffer 140. Specifically, but without limitation, rather than reading and deleting all the cells containing unneeded data from a packet, the processor 132 could:

(1) Search through the linked list and go through the total amount of bytes needed then update the next-pointer to be null. As an example, if the needed amount of data is smaller than the data of a single cell—there will be only a single read/write into the memory.
(2) Update respective length fields on the packet's "descriptor."
(3) Implement the linked list in memory and not in the buffer itself, which could remove the need to write/read to the buffer.

The method 300 may then proceed by storing the truncated packet in a buffer 140 (step 320). In some embodiments, the truncated packet is written to the buffer, but later than usual. In this example, it may be possible to write only the necessary portions to the buffer to begin with so there is no need for any additional write/read to the buffer. In some embodiments, the truncated packet may be stored in the same number of cells that would have been used to store the original packet. If, however, truncation of the packet results in a reduction of the packet size by an amount sufficient to reduce the number of cells required to store the truncated packet, then the truncated packet may be stored in the buffer 140 with fewer cells than were determined to be required for the original packet.

The method 300 may continue with the processor 132 preparing the truncated packet for transmission via the interface 116 (step 324). Preparation for transmission may include packet queuing and scheduling. Preparation for transmission may also include selecting one or more output ports from the interface 116 to use for transmission of the truncated packet to a data target 112. The truncated packet may optionally be passed through the MUX/DEMUX 148 to be multiplexed prior to transmission (step 328). Whether multiplexed or not, the packet is then transmitted via the selected port(s) (step 332).

As discussed above, packet truncation can help utilize fewer buffer 140 resources. In addition to reducing buffer size requirements, the packet truncation processes described herein can also accelerate the performance of networking device 104 sending the truncated packets. Specifically, but without limitation, the networking device 104 may become capable of reaching line rate on its egress ports and will consume less power due to fewer buffer operations and less data is being transferred within the device itself.

Figure 4:
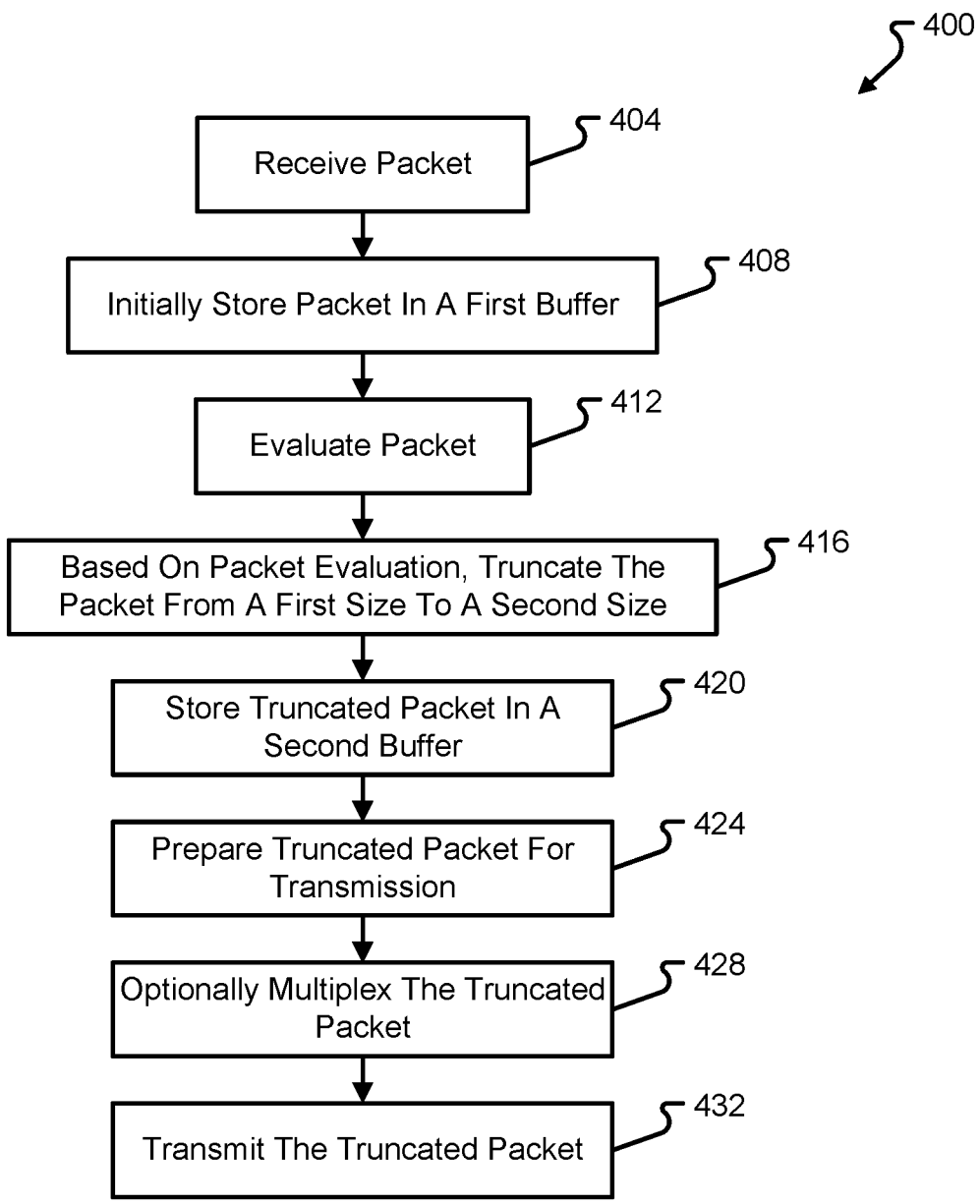
FIG. 4 is a flow diagram illustrating a second packet processing method in accordance with at least some embodiments of the present disclosure.

Referring now to FIG. 4, a second packet processing method 400 will be described in accordance with at least some embodiments of the present disclosure. The method 400 begins when a packet is received at the networking device 104 (step 404). The packet is initially stored in a first buffer 140 (step 408). The type of device used as the first buffer 140 may correspond to any suitable type of buffer memory. The first buffer 140 may include any of the memory devices depicted and described herein that are within or available to the networking device 104.

The method 400 continues with the processor 132 evaluating the packet (step 412). The packet may be evaluated as part of a parsing and forwarding decision 220. Based on the evaluation of the packet, a truncation decision 212 may be made by the processor 132 (step 416). As part of making an affirmative truncation decision 212, the packet may be truncated from a first size to a second, smaller size.

The truncated packet may then be stored in a second buffer 140 (step 420). In this step, packet data from the first buffer 140 may be truncated, then subsequently stored in the second buffer 140. The original packet data in the first buffer 140 may then be overwritten or the cells in the first buffer 140 may be released for storing data of different packets. Meanwhile, the second buffer 140 stores the truncated packet while the packet is prepared for transmission (step 424). Prior to transmission, the packet data retrieved from the second buffer 140 may be multiplexed (step 428). Whether the packet data retrieved from the second buffer 140 is multiplexed or not, the method 400 continues by transmitting the truncated packet to one or more data targets 112 (step 432). The truncated packet may be transmitted via one or more ports of the interface 116.

Figure 5:
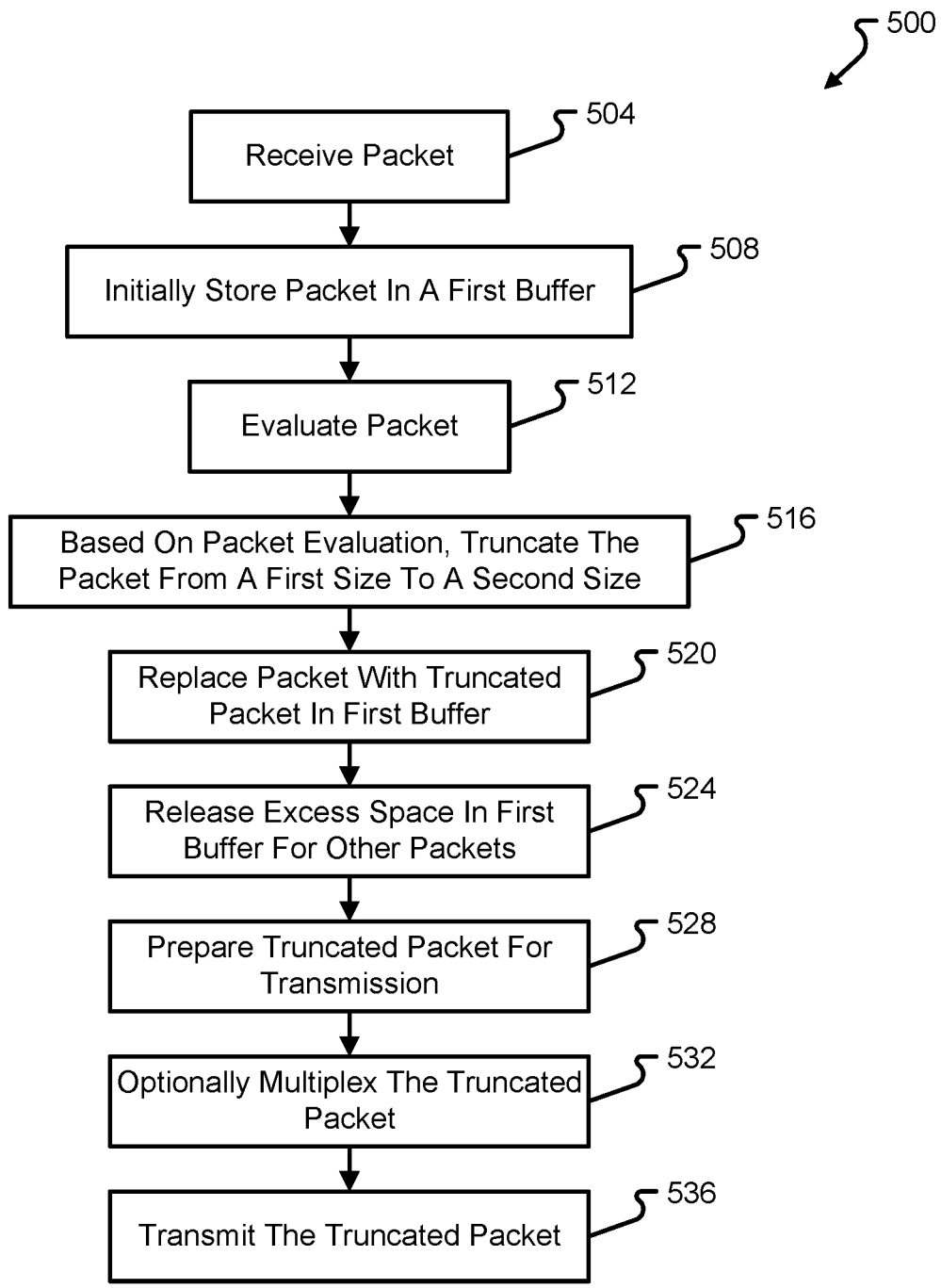
FIG. 5 is a flow diagram illustrating a third packet processing method in accordance with at least some embodiments of the present disclosure.

Referring now to FIG. 5, a third packet processing method 500 will be described in accordance with at least some embodiments of the present disclosure. The method 500 begins when a packet is received at the networking device 104 (step 504). The packet is initially stored in a first buffer 140 (step 508). The type of device used as the first buffer 140 may correspond to any suitable type of buffer memory. The first buffer 140 may include any of the memory devices depicted and described herein that are within or available to the networking device 104.

The method 500 continues with the processor 132 evaluating the packet (step 512). The packet may be evaluated as part of a parsing and forwarding decision 220. Based on the evaluation of the packet, a truncation decision 212 may be made by the processor 132 (step 516). As part of making an affirmative truncation decision 212, the packet may be truncated from a first size to a second, smaller size.

The truncated packet may then be stored in the first buffer 140, but at the second smaller size. The storage (or re-storage) of the truncated packet in the first buffer 140 may be achieved in a number of ways. In one example, the original packet may be replaced by the truncated packet in the first buffer 140 (e.g., via a re-write process) (step 520). In another example, a linked list may be updated to release at least some cells in the first buffer 140 that are no longer required to store the truncated packet, but were previously used to store the original packet. In this example, there is no need to change the data stored in the first buffer 140, but at least some of the cells of the buffer 140 are released and made available for storing other packets (step 524). It should be appreciated that both steps 520 and 524 may also be performed as part of storing the truncated packet in the first buffer 140.

The method 500 then continues by preparing the truncated packet for transmission (step 528). Preparation of the packet may include a queuing and scheduling of the packet for transmission via one or more selected ports. Prior to transmission, the truncated packet may be multiplexed (step 532). Whether the truncated packet is multiplexed or not, the method 500 continues by transmitting the truncated packet to one or more data targets 112 (step 536). The truncated packet may be transmitted via one or more ports of the interface 116.

Figure 6:
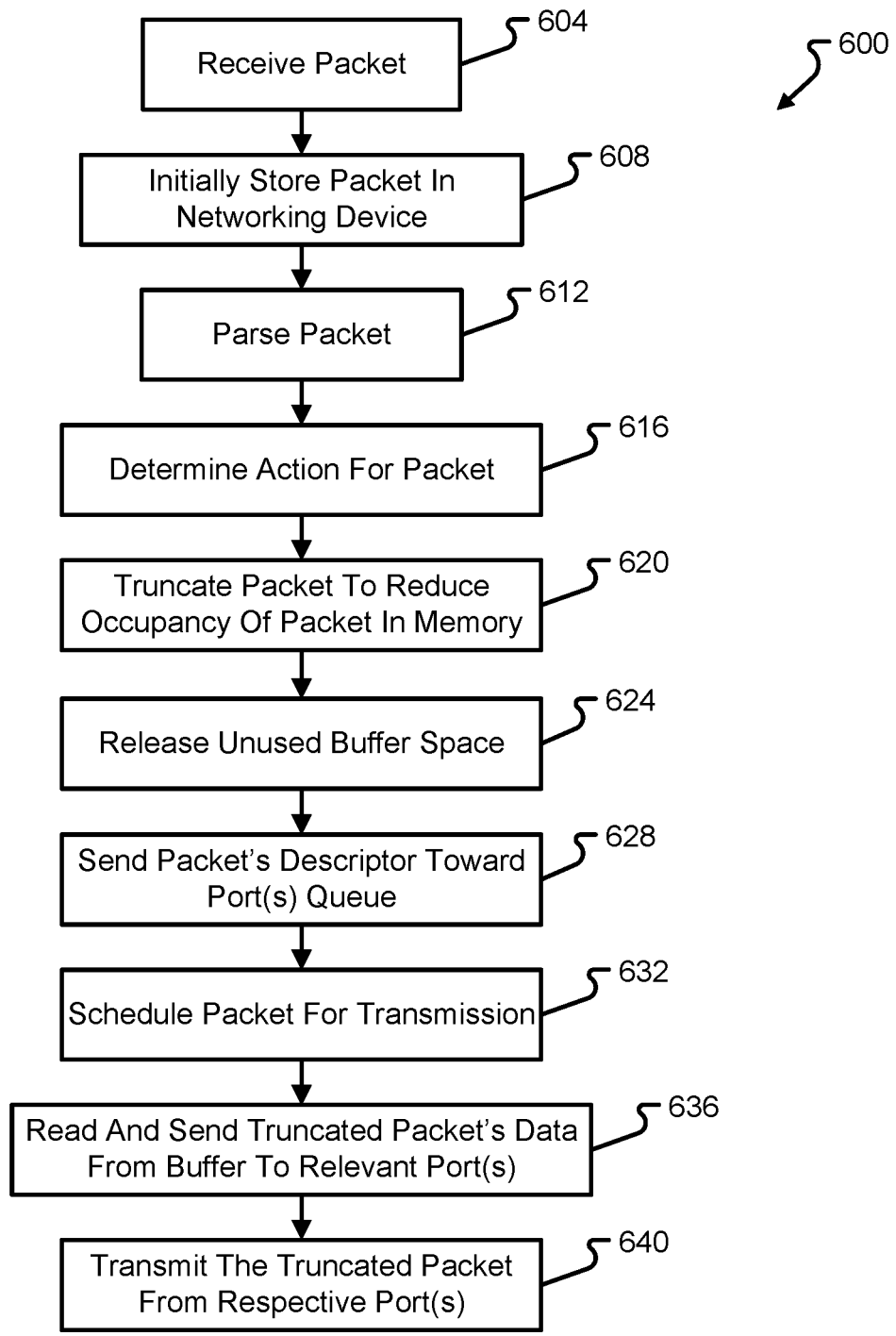
FIG. 6 is a flow diagram illustrating a fourth packet processing method in accordance with at least some embodiments of the present disclosure.

Referring now to FIG. 6, a fourth packet processing method 600 will be described in accordance with at least some embodiments of the present disclosure. The method 600 begins when a packet is received at the networking device 104 (step 604). The packet is initially stored in memory of the networking device 104 (step 604). The packet may be stored in a buffer 140 or any other memory 136 within the networking device 104. The memory used to store the truncated packet may be contained within a common housing as other components of the networking device 104 and may be contained within a data processing unit 128.

The method 600 continues with the processor 132 parsing the packet and performing an evaluation of the packet based on the parsing thereof (step 612). Based on the evaluation of the packet during parsing, a decision may be made by the processor 132 with respect to one or more actions to take on the packet (step 616). One action that may be taken on the packet is to truncate the packet from a first size to a second, smaller size (step 620). In some embodiments, it may also be possible to release the buffer space that is now effectively unused (e.g., that was previously stored the untruncated packet) (step 624).

Once the packet has been truncated (or before truncation), the packet's descriptors may be sent toward a port queue that was selected during the packet parsing (step 628). Upon receiving the packet's descriptors at the port queue, the packet may be scheduled for transmission (step 632). When the packet reaches the front of the queue, the truncated packet's data may be retrieved from the buffer 140 in which it is stored and provided to the port(s) that will be transmitting the truncated packet (step 636). The method 600 continues by transmitting the truncated packet to one or more data targets 112 (step 640).

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A networking device, comprising:
   an interface that receives one or more packets;
   a buffer that temporarily stores the one or more packets prior to being transmitted by the networking device; and
   circuitry that evaluates a packet received at the interface and, based on the evaluation of the packet, truncates the packet thereby reducing a size of the packet prior to storing the packet in the buffer, wherein the packet is initially stored in the buffer prior to truncation and at least one pointer is adjusted as part of truncating the packet to release at least one cell in the buffer thereby allocating more buffer space to storage of other packets.

2. The networking device of claim 1, wherein the circuitry further divides the packet into two or more packet portions that are stored in a corresponding two or more cells in the buffer.

3. The networking device of claim 2, wherein the packet is divided prior to truncation.

4. The networking device of claim 2, wherein the packet is divided after truncation.

5. The networking device of claim 2, wherein the truncated packet occupies a number of cells in the buffer that is smaller than a number of cells that the packet would occupy prior to truncation.

6. The networking device of claim 1, further comprising:
   an output port, wherein the circuitry reads the truncated packet from the buffer and causes the truncated packet to be transmitted via the output port.

7. The networking device of claim 1, further comprising:
   a multiplexer, wherein the circuitry reads the truncated packet from the buffer and causes the truncated packet to be provided to the multiplexer.

8. The networking device of claim 1, wherein the circuitry determines an amount of buffer space saved by truncating the packet and frees up the amount of buffer space for storage of an additional packet prior to reading the truncated packet from the buffer.

9. The networking device of claim 1, wherein the circuitry reads the truncated packet from the buffer using at least one of a linked list and a database lookup.

10. The networking device of claim 1, wherein the circuitry updates a descriptor of the packet to describe a length of the truncated packet as stored in the buffer.

11. The networking device of claim 1, wherein the packet carries data from a data source intended for transmission to a data target, wherein a reduced amount of the data is stored in the buffer when the packet is truncated, and wherein the reduced amount of the data is read from the buffer as part of transmitting the packet to the data target.

12. A system, comprising:
    a networking device that receives one or more packets, wherein the networking device comprises a buffer that temporarily stores the one or more packets prior to being transmitted by the networking device; and
    a controller that evaluates a packet received at the networking device and, based on the evaluation of the packet, truncates the packet thereby reducing a size of the packet for storage in the buffer, wherein the packet is initially stored in the buffer prior to truncation and at least one pointer is adjusted as part of truncating the packet to release at least one cell in the buffer thereby allocating more buffer space to storage of other packets.

13. The system of claim 12, wherein the controller is provided as part of the networking device.

14. The system of claim 12, wherein the controller divides the packet into two or more packet portions that are stored in a corresponding two or more cells in the buffer.

15. The system of claim 14, wherein the truncated packet occupies a number of cells in the buffer that is smaller than a number of cells that the packet would occupy prior to truncation.

16. The system of claim 12, wherein the controller determines an amount of buffer space saved by truncating the packet and frees up the amount of buffer space for storage of an additional packet prior to reading the truncated packet from the buffer.

17. The system of claim 12, wherein the packet carries data from a data source intended for transmission to a data target, wherein a reduced amount of the data is stored in the buffer when the packet is truncated, and wherein the reduced amount of the data is read from the buffer as part of transmitting the packet to the data target.

18. A method, comprising:
    receiving a packet at a networking device;
    evaluating the packet;
    based on the evaluation of the packet, truncating the packet from a first size to a second size that is smaller than the first size; and
    storing the truncated packet in a buffer prior to transmitting the truncated packet with the networking device, wherein the packet is initially stored in the buffer prior to truncation and at least one pointer is adjusted as part of truncating the packet to release at least one cell in the buffer thereby allocating more buffer space to storage of other packets.

19. The method of claim 18, further comprising:
    dividing the packet into two or more packet portions that are stored in a corresponding two or more cells of the buffer, wherein the truncated packet occupies a number of cells in the buffer that is smaller than a number of cells that the packet would occupy in the buffer prior to truncation.

20. The method of claim 18, further comprising:
    multiplexing the truncated packet; and
    transmitting the multiplexed truncated packet via a port of the networking device.

21. The method of claim 18, further comprising:
    determining at least one of a port and queue to which the packet should be sent; and
    sending the packet to the determined at least one of a port and queue.

* * * * *